(12) United States Patent
Butterfield, IV (10) Patent No.: US 11,486,513 B2
(45) Date of Patent: Nov. 1, 2022

(54) PORTABLE VALVE HANDWHEEL TOOL

(71) Applicant: Chevron U.S.A. Inc., San Ramon, CA (US)

(72) Inventor: Albert E. Butterfield, IV, Novato, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 119 days.

(21) Appl. No.: 17/082,275

(22) Filed: Oct. 28, 2020

(65) Prior Publication Data

US 2022/0128169 A1 Apr. 28, 2022

(51) Int. Cl.
*F16K 31/60* (2006.01)

(52) U.S. Cl.
CPC .................. *F16K 31/60* (2013.01)

(58) Field of Classification Search
CPC ....... B25B 13/50; B25B 13/48; B25B 23/145; B25B 23/14; B25B 21/00; B25B 21/002; F16K 31/60
USPC .................. 251/90, 101, 231, 291
See application file for complete search history.

(56) References Cited

U.S. PATENT DOCUMENTS

| | | | |
|---|---|---|---|
| 92,438 A * | 7/1869 | Ford .................. | B25B 13/48 81/74 |
| 289,303 A * | 11/1883 | Park et al. ............. | F16D 1/08 403/202 |
| 390,408 A * | 10/1888 | Spaulding et al. ..... | B25B 13/48 81/74 |
| 819,614 A * | 5/1906 | Stewart et al. ......... | B25B 13/48 81/74 |
| 1,525,213 A * | 2/1925 | Tietze .................... | B25G 1/005 81/74 |
| 1,931,751 A * | 10/1933 | Brown .................... | F16K 31/60 251/293 |
| 2,086,722 A * | 7/1937 | Matuella ................. | B25B 13/48 74/543 |
| 2,402,477 A * | 6/1946 | Williams ............... | B25B 13/466 81/176.15 |
| 2,539,262 A * | 1/1951 | Moore .................... | B25B 13/48 81/119 |
| 2,920,517 A * | 1/1960 | Willey, Jr. ............. | G05G 1/085 81/119 |
| 4,885,962 A | 12/1989 | Summers | |
| 4,991,469 A * | 2/1991 | Pella ..................... | B25B 13/48 81/176.1 |
| 5,320,003 A * | 6/1994 | Ely ........................ | B25B 13/48 81/462 |

(Continued)

*Primary Examiner* — Umashankar Venkatesan
(74) *Attorney, Agent, or Firm* — King & Spalding LLP (57) ABSTRACT

A portable valve handwheel tool includes a main drive arm that is configured to rotate a valve handwheel. The main drive arm includes a first drive spoke having a first retainer configured to engage a first spoke of the valve handwheel. The main drive arm further includes a first plate and a drive hub that extends from a broad side of the first plate of the main drive arm. The portable valve handwheel tool also includes a second drive arm having a second drive spoke with a second retainer. The second retainer is configured to engage a second spoke of the valve handwheel. The second drive arm further includes a second plate having a second center hole that allows the drive hub to pass therethrough. The portable valve handwheel tool also includes a locking mechanism that attaches the main drive arm to the second drive arm.

19 Claims, 7 Drawing Sheets

(56) References Cited

U.S. PATENT DOCUMENTS

| | | | | |
|---|---|---|---|---|
| 5,381,996 | A * | 1/1995 | Arnemann | F16K 31/12 |
| | | | | 251/59 |
| 5,638,590 | A * | 6/1997 | Silano | B25B 19/00 |
| | | | | 29/254 |
| 5,924,442 | A * | 7/1999 | Vorosmarti | F16K 17/36 |
| | | | | 251/59 |
| 6,026,550 | A * | 2/2000 | Silano | B25B 27/24 |
| | | | | 29/266 |
| 6,293,515 | B1 * | 9/2001 | Clark | F01L 13/0005 |
| | | | | 251/293 |
| 7,118,091 | B2 * | 10/2006 | Price | F16K 35/06 |
| | | | | 251/293 |
| 2003/0047041 | A1 * | 3/2003 | Trout | B25B 13/50 |
| | | | | 81/176.15 |
| 2004/0045414 | A1 * | 3/2004 | Reuschel | B25B 23/145 |
| | | | | 81/54 |
| 2018/0297178 | A1 * | 10/2018 | Knepp | B25B 13/5008 |

* cited by examiner

```
┌─────────────────────────────────────────────────────────┐
│ Install a main drive arm and a drive hub of a portable valve │
│ handwheel tool on the valve handwheel                    702 │
└─────────────────────────────────────────────────────────┘
                            │
                            ▼
┌─ ─ ─ ─ ─ ─ ─ ─ ─ ─ ─ ─ ─ ─ ─ ─ ─ ─ ─ ─ ─ ─ ─ ─ ─ ─ ─ ─ ┐
│ Install a second drive arm on the main drive arm of the │
│ portable valve handwheel tool                        704 │
└─ ─ ─ ─ ─ ─ ─ ─ ─ ─ ─ ─ ─ ─ ─ ─ ─ ─ ─ ─ ─ ─ ─ ─ ─ ─ ─ ─ ┘
                            │
                            ▼
┌─ ─ ─ ─ ─ ─ ─ ─ ─ ─ ─ ─ ─ ─ ─ ─ ─ ─ ─ ─ ─ ─ ─ ─ ─ ─ ─ ─ ┐
│ Install a spacer by passing the drive hub through a spacer │
│ center hole of the spacer                            706 │
└─ ─ ─ ─ ─ ─ ─ ─ ─ ─ ─ ─ ─ ─ ─ ─ ─ ─ ─ ─ ─ ─ ─ ─ ─ ─ ─ ─ ┘
                            │
                            ▼
┌─────────────────────────────────────────────────────────┐
│ Attach a rotational drive tool to the drive hub       708 │
└─────────────────────────────────────────────────────────┘
                            │
                            ▼
┌─────────────────────────────────────────────────────────┐
│ Power on the rotational drive tool to transfer a drive force to │
│ the drive hub to rotate the valve handwheel         710 │
└─────────────────────────────────────────────────────────┘
```

FIG. 7

PORTABLE VALVE HANDWHEEL TOOL

TECHNICAL FIELD

The present disclosure relates generally to a portable valve handwheel tool that opens and closes valves.

BACKGROUND

In applications such as oil refineries, power plants, and gas operations, valve handwheels are operated often for opening and closing valves that are associated with heavy pipelines. Those valves include gate valves and butterfly valves and are most commonly operated by handwheels ranging in diameter from below 4 inches to 18 inches and greater. The handwheels may have various spoke designs, e.g., a 3 spoke handwheel, a 4 spoke handwheel, a 5 spoke handwheel, or a 6 spoke handwheel, to help open or close a valve by turning the handwheels counterclockwise or clockwise respectively. In general, plant operators or mechanics have to manually open or close the valves by applying torque forces to handwheels over a great number of handwheel turns with heavy pipelines, in particular, requiring a great number of turns of the handwheel. Large refineries and plants can have hundreds of valve handwheels requiring manual operation.

Valves that are not regularly maintained or that are exposed to corrosive atmospheres may stick or freeze in one position and then require application of heavy or extreme torque force to rotate the handwheels. Additionally, some valve handwheels require at least two people to operate over a period of time. The operation of the handwheels may be time consuming, costly, and ergonomically undesirable, and may cause safety issues.

Thus, a portable valve handwheel tool that helps rotate handwheels and that is adjustable to fit on handwheels of various sizes and with different numbers of spokes may be desirable.

SUMMARY

The present disclosure relates generally to opening or closing valve handwheels using a portable valve handwheel tool. In an example embodiment, a portable valve handwheel tool includes a main drive arm that is configured to rotate a valve handwheel. The main drive arm includes a first drive spoke having a first retainer. The first retainer is configured to engage a first spoke of the valve handwheel. Further, the main drive arm includes a first plate that is disposed at one end of the first drive spoke. The first plate has a first center hole that allows a valve handwheel stem to pass therethrough. The portable valve handwheel tool further includes a drive hub that extends from a broad side of the first plate of the main drive arm. The portable valve handwheel tool also includes a second drive arm. The second drive arm includes a second drive spoke having a second retainer. The second retainer is configured to engage a second spoke of the valve handwheel. In addition, the second drive arm further includes a second plate that is disposed at one end of the second drive spoke. The second plate has a second center hole that allows the drive hub to pass therethrough. Further, the portable valve handwheel tool includes a spacer that is in contact with the second drive arm. The spacer has a spacer center hole that allows the drive hub to pass therethrough. The portable valve handwheel tool also includes a locking mechanism that attaches the main drive arm to the second drive arm.

In another example embodiment, a portable valve handwheel tool includes a drive arm that is configured to rotate a valve handwheel. The drive arm includes a drive spoke having a retainer. The retainer is configured to engage a spoke of the valve handwheel. Further, the drive arm includes a plate disposed at one end of the drive spoke. The plate has a center hole that allows a valve handwheel stem to pass therethrough. The portable valve handwheel tool further includes a drive hub that extends from a broad side of the plate of the main drive arm.

In another example embodiment, a method for operating a valve handwheel includes installing a main drive arm and a drive hub of a portable valve handwheel tool on the valve handwheel by passing a valve handwheel stem through a main center hole of the main drive arm and the drive hub, where a first spoke retainer attached to a drive spoke of the main drive arm engages a first spoke of the valve handwheel. Further, the method includes attaching a rotational drive tool to the drive hub. The method also includes powering on the rotational drive tool to transfer a drive force to the drive hub to rotate the valve handwheel.

These and other aspects, objects, features, and embodiments will be apparent from the following description and the appended claims.

BRIEF DESCRIPTION OF THE DRAWINGS

Reference will now be made to the accompanying drawings, which are not necessarily drawn to scale, and wherein.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, the same reference numerals used in different embodiments designate like or corresponding, but not necessarily identical, elements.

DETAILED DESCRIPTION OF EXAMPLE EMBODIMENTS

In the following paragraphs, particular embodiments will be described in further detail by way of example with reference to the drawings. In the description, well-known components, methods, and/or processing techniques are omitted or briefly described. Furthermore, reference to various feature(s) of the embodiments is not to suggest that all embodiments must include the referenced feature(s).

Figure 1:
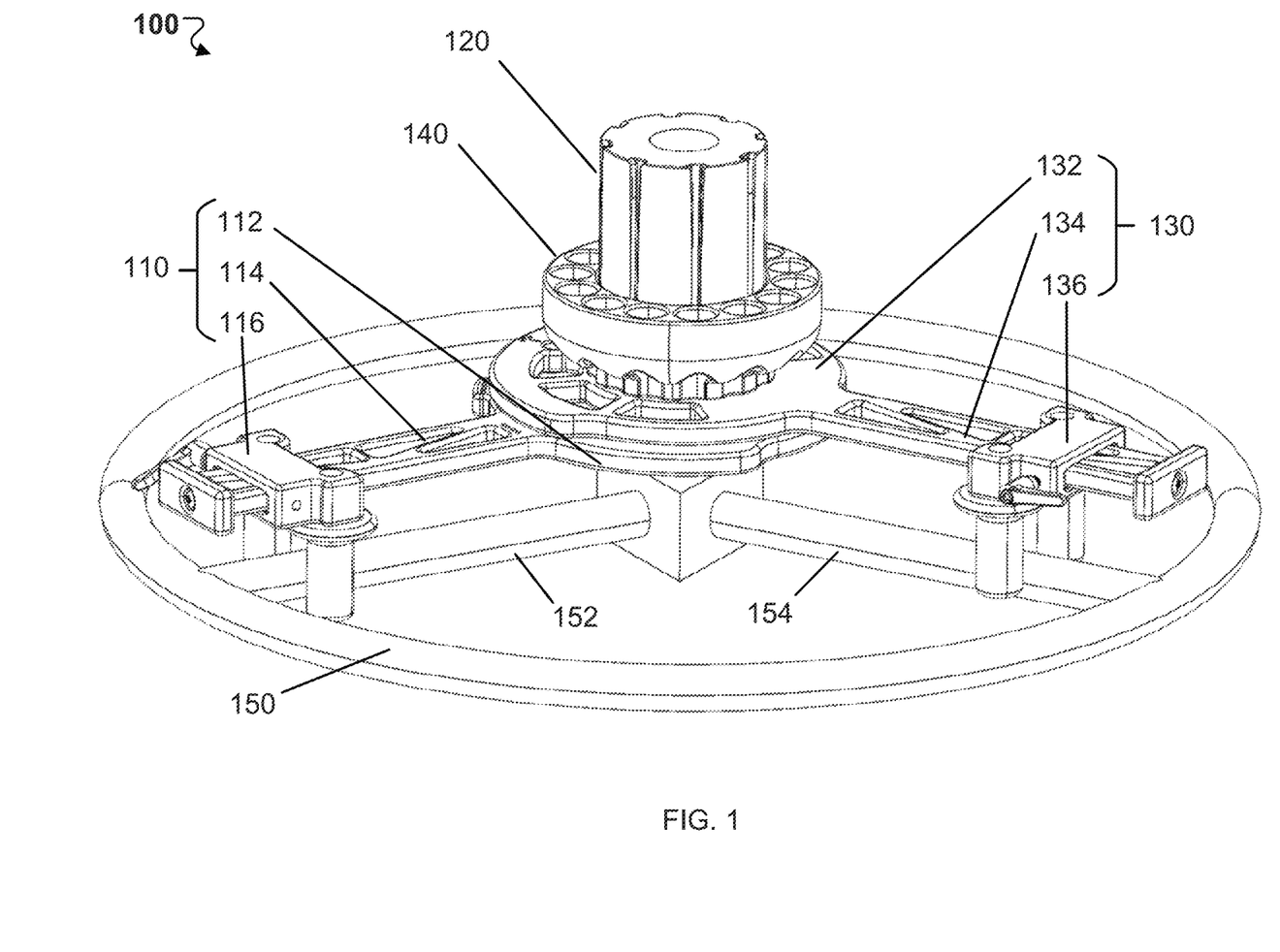
FIG. 1 is a perspective view of a portable valve handwheel tool for opening and closing a valve according to an example embodiment.

Turning now to the drawings, FIG. 1 illustrates a perspective view of a portable valve handwheel tool 100 for opening and closing a valve according to an example embodiment. The portable valve handwheel tool 100 is configured to be attached on a handwheel of a valve and to open or close the valve by rotating the handwheel. For example, some embodiments of the portable valve handwheel tool 100 are configured to engage two spokes of the handwheel and rotate the handwheel by applying torque forces to the two spokes. The portable valve handwheel tool 100 can open or close the valve by rotating the handwheel in counterclockwise or clockwise directions, respectively.

In an example embodiment, the portable valve handwheel tool 100 includes a main drive arm 110, a drive hub 120, a second drive arm 130, and a spacer 140. The main drive arm 110 has a first plate 112 and a first drive spoke 114. The second drive arm 130 has a second plate 132 and a second drive spoke 134. The first plate 112 is disposed at one end of the first drive spoke 114 and the second plate 132 is disposed at one end of the second drive spoke 134. The drive hub 120 is positioned on the first plate 112 of the main drive arm 110. Particularly, as shown on FIG. 1, the drive hub 120 is in a cylinder shape and extends from a broad side, e.g., a top surface, of the first plate 112. In this example, the spacer 140 is located on the second drive arm. The spacer 140 has a spacer center hole which allows the drive hub 120 to pass therethrough. In an example embodiment, the first drive spoke 114 includes a first retainer 116 that is configured to engage a spoke 152 of the handwheel 150. Similarly, the second drive spoke 134 includes a second retainer 136 that is configured to engage a spoke 154 of the handwheel 150. In this example, the main drive arm 110 includes a first center hole on the first plate 112 which allows a valve handwheel stem to pass therethrough. Further, the second drive arm 130 is positioned on the main drive arm 110 by passing through the drive hub 120 through a second center hole of the second plate 132.

In an example embodiment, the portable valve handwheel tool 100 also includes a locking mechanism that attaches the second drive arm 130 to the main drive arm 110. With this locking mechanism, the first drive spoke 114 and the second drive spoke 134 are respectively aligned with spokes 152 and 154 of the handwheel 150. For example, as shown in FIG. 1, the main drive arm 110 and the second drive arm 130 are locked by the locking mechanism to be oriented with an angle of 120° between longitudinal axes of the first drive spoke 114 and the second drive spoke 134. In an example embodiment, the first retainer 116 is configured to engage a first spoke 152 of the valve handwheel 150. The second retainer 136 is also configured to engage a second spoke 154 of the valve handwheel 150. Because the first center hole of the first plate 112 has the valve handwheel stem to pass through, the engagement of the first retainer 116 to the first spoke 152 leads to the alignment between the first drive spoke 114 and the spoke 152 of the handwheel. Similarly, as the second center hole of the second plate 132 is passed by the valve handwheel stem, the engagement of the second retainer 136 to the second spoke 154 leads to the alignment between the second drive spoke 134 and the spoke 154 of the handwheel. It should be understood that in alternate embodiments the drive spokes be curved or have other shapes.

In an example embodiment, the portable valve handwheel tool 100 may be driven by a rotational drive tool, e.g., a pipe threader. The rotational drive tool may be positioned on the drive hub 120 to rotate the drive hub 120. In this example, the drive hub 120 may extend from the main drive arm 110 and is locked on the first plate 112. The rotation of the drive hub 120 drives the main drive arm 130 to rotate. Further, since the second drive arm 130 is locked with the main drive arm 110, a drive force transferred from the drive hub 120 may be split between the main drive arm 110 and the second drive arm 130. As shown in FIG. 1, split drive forces may be respectively transferred from the first drive spoke 114 and the second drive spoke 134 to the engaged spokes 152 and 154 of the handwheel 150, and drive the handwheel to rotate. Here, a ratio between drive forces split between the main drive arm to the second drive arm may be in a range from 5:5 to 9:1. In an example embodiment, the spacer 140 is located between the rotational drive tool and the second drive arm 130, and may be configured to prevent the rotational drive tool from impacting the second drive arm 130 when installing the rotational drive tool onto the portable valve handwheel tool 100. It should be understood that the spacer 140 is an optional component that may be absent for other example embodiments of the portable valve handwheel tool.

Figure 2:
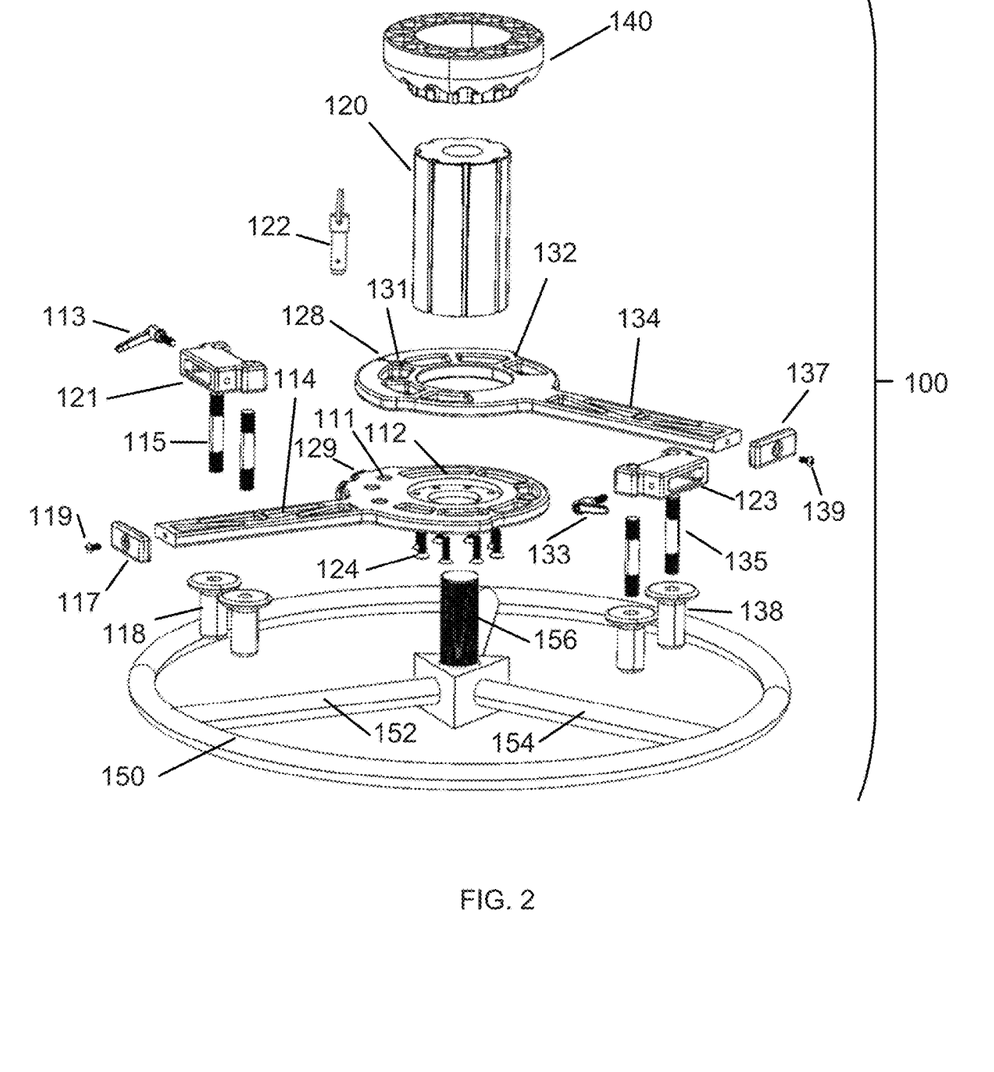
FIG. 2 is an exploded view of the portable valve handwheel tool of FIG. 1 according to an example embodiment.

FIG. 2 is an exploded view of the portable valve handwheel tool 100 of FIG. 1 according to an example embodiment. To minimize redundancy, not all features of the portable valve handwheel tool 100 discussed with respect to FIG. 1 are repeated below. As described above, the portable valve handwheel tool 100 includes a main drive arm 110, a drive hub 120, a second drive arm 130, and a spacer 140. FIG. 2 illustrates detailed configurations and components included in the main drive arm 110 and the second drive arm 130.

In an example embodiment, the main drive arm 110 has a first plate 112, a first drive spoke 114, and a first retainer 116. Further, the first retainer 116 includes a first spoke slide 121, a first spoke slide lock 113, a first pair of spoke rods 115, and a first pair of spoke roller guards 118. As shown in FIG. 2, the first spoke slide 121 is attached on the first drive spoke 114, having the first drive spoke pass therethrough. With this configuration, the first spoke slide 121 is able to slide along a first longitudinal axis of the first drive spoke 114 and to locate the first retainer 116 according to a size of the handwheel 150. Here, the first spoke slide 121 is locked on the first drive spoke 114 by tightening the first spoke slide lock 113. In this example, the first spoke slide lock 113 has a thread end that is inserted through a sidewall hole of the first spoke slide 121. The first spoke slide lock 113 may be tightened so that its thread end is in contact with the first drive spoke 114 and lock the first spoke slide 121 on the first drive spoke 114.

In an example embodiment, the first pair of spoke rods 115 may be double-end threaded rods and extend from the first spoke slide 121. Here, one end of the first pair of spoke rods 115 may be threaded into a pair of through holes of the first spoke slide 121. The other end of the first pair of the spoke rods 115, as shown in FIG. 2, may be threaded into the first pair of spoke roller guards 118. The first pair of spoke roller guards 118 may include a top portion that is in contact with the first spoke slide 121 with a larger diameter and a bottom portion in a cylinder shape with a smaller diameter. In this example, the first pair of spoke roller guards 118 may be configured to isolate the first pair of spoke rods from the first spoke 152 of the handwheel 150. Here, the first pair of spoke roller guards 118 may be implemented to reduce collisions or paint damages on the first spoke 152 during the rotation of the handwheel 150. The first pair of spoke roller guards 118 may be made of Teflon.

In an example embodiment, the first retainer 116 engages the first spoke 152 by clamping the first pair of spoke roller guards 118 on the first spoke 152. In this example, the first pair of spoke roller guards 118 may have a height that is taller than a thickness of the first spoke 152 as illustrated in FIG. 1. The aforementioned configurations may be adopted here to assure a stable interaction between the first pair of spoke roller guards 118 and the first spoke 152. This configuration may improve safety during the handwheel operation, for example, to avoid spoke slipping during the rotation of the handwheel 150. Here, are least one of the first pair of spoke roller guards 118 is in contact with the first spoke 152. With this configuration, a drive force transferred to the main drive arm 110 can be delivered to the first spoke 152 through the first retainer 116.

In an example embodiment, the first drive spoke 114 may include a first spoke endcap 117 which is disposed at another end of the first drive spoke 114, i.e., the end opposite the first plate 112. The first spoke endcap 117 may be in a rectangular shape and be tightened by a screw 119 on the another end of the first drive spoke. As shown in FIGS. 1 and 2, a top surface of the first spoke endcap 117 may be higher than a top surface of the first drive spoke 114 as the first spoke endcap 117 is tightened thereon. With this configuration, the first spoke endcap 117 stops the first spoke slide 121 from further sliding on the first spoke 114 and falling off at the another end of the first spoke 114.

In an example embodiment, the second drive arm 130 may include a second plate 132, a second drive spoke 134, and a second retainer 136. Further, the second retainer 136 may include a second spoke slide 123, a second spoke slide lock 133, a second pair of spoke rods 135, and a second pair of spoke roller guards 138. The assembly as well as the functions of those parts of the second retainer 136 are similar to those described above of the first retainer 116. In this example, the second retainer 136 engages the second spoke 154 of the handwheel 150. In particular, at least one of the second pair of spoke roller guards 138 is in contact with the second spoke 154 to deliver a drive force transferred from the drive hub 120 to the second spoke 154 through the second retainer 136. Here, the drive force is split from the main drive arm 110 to the second drive arm 130 by a locking mechanism therebetween. Specifically, a ratio between drive forces applied on the main drive arm 110 and the second drive arm 130 may be in a range from 5:5 to 9:1. In an example embodiment, the second drive spoke 134 may include a second spoke endcap 137 that is disposed at another end of the second drive spoke 134, i.e., the end opposite the second plate 132. Similarly, the second spoke endcap 137 may be in a rectangular shape and be tightened by a screw 139 on the another end of the second drive spoke 134. A top surface of the second spoke endcap 137 may be higher than a top surface of the second drive spoke 134 when the second spoke endcap 137 is tightened thereon. Similar to the first spoke endcap 117, the second spoke endcap 137 is configured to stop the second spoke slide 123 from further sliding on the second spoke 134 and falling off at the another end of the second spoke 134.

In an example embodiment, the drive hub 120 is positioned on the first plate 112 of the main drive arm 110 by bolting a plurality of counter sunk screws 124 through a plurality of holes of the first plate 112 into a bottom surface of the drive hub 120. In this example, the drive hub 120 is locked on the main drive arm 110 by tightening the plurality of counter sunk screws 124 thereon and passing the handwheel stem 156 through a center hole of the drive hub 120. Further, the second drive arm 130 is aligned with the main drive arm 110 by firstly passing the drive hub 120 through a second center hole of the second drive arm 130. Secondly, the main drive arm 110 and the second drive arm 130 are oriented with an angle between a first longitudinal axis of the first drive spoke 114 and a second longitudinal axis of the second drive spoke 116. For example, the first drive spoke 114 and the second drive spoke 116 may be aligned to form an angle of 120° to fit an operation on the three spoke handwheel 150. In other example embodiments, the first drive spoke 114 and the second drive spoke 116 may be aligned to form an angle of one of 120°, 144°, and 180° to fit an operation on one of a six spoke handwheel, a five spoke handwheel, and a four spoke handwheel, respectively.

The alignment of the first drive spoke 114 and the second drive spoke 116 is locked by inserting a quick release pin 122 through one of a plurality of aligning holes 111 on the first plate 112 and an aligning hole 131 on the second plate 132. In alternate embodiments, quick release pin can be replaced by other fastening mechanisms such as a clamp or a detent. In the example shown in FIG. 2, the first plate includes three aligning holes 111 that are located at varying distances from the one end of the first drive spoke 114. These three aligning holes 111 are respectively corresponding to alignment angles of 180°, 144°, and 120° between the first drive spoke 114 and the second drive spoke 116. Consequently, these aligning holes 111 may be specifically chosen for aligning the main drive arm 110 and the second drive arm 130 to operate valve handwheels with various numbers of spokes. In an example embodiment, the first plate 112 may also include convex parts 129 that are located on an outer edge of the first plate and that are adjacent to the plurality of aligning holes 111, respectively.

In an example embodiment, once the second drive arm 130 is installed onto the main drive arm 110 by passing the drive hub 120 through its center hole, it is further rotated within its frontal plane to align its aligning hole 131 with one of the aligning holes 111 on the first plate 112. Here, a mark pointer 128 located on the second plate 132 may be used to help the alignment by specifically pointing to one of the convex parts 129 on the first plate 112. In an example embodiment, the second plate 132 may include a plurality of aligning holes and a plurality of mark pointers. In an example embodiment, the quick release pin 122 may be installed through the aligning hole 131 and one of the aligning holes 111. As shown in FIG. 2, the quick release pin 122 may include a pin shaft, a split ring at one end of the pin shaft, and a pair of spring loaded ball bearings projected out at the other end of the pin shaft. When the quick release pin 122 is installed, the spring loaded ball bearings project out of the pin shaft below the first plate 112, locking the quick release pin 122. The main drive arm 110 and the second drive arm 130 are then locked within their frontal plane and can not be further rotated relative to one another. This quick release pin 122 can be removed by simply pulling out from the aligning holes describe above.

In an example embodiment, the portable valve handwheel tool 100 may include various hollow shapes on the main drive arm 110 and the second drive arm 130. Specifically, the first drive spoke 114 and the second drive spoke 134 may include multiple triangular hollow shapes. The first plate 112 and the second plate 132 may include arc hollow shapes. Here, the purpose of implementing the hollow shapes is to reduce the weight of the portable valve handwheel tool 100, while maintaining sufficient strength of the tool. In this example, the weight of the portable valve handwheel tool 100 may be lower than 10 pounds. Additionally, the portable valve handwheel tool 100 can operate on valve handwheels ranging in diameter from 8 inches to 18 inches. In an example embodiment, the spacer 140 may include hollow cylinder shape holes so as to reduce the weight of the spacer 140. In an example embodiment, a diameter of the spacer 140 may be in a range from 0.5 inch to 3.25 inches.

In one example, during operation, the main drive arm 110 and the second drive arm 130 are aligned such that the first drive spoke 114 and the second drive spoke 134 are respectively in parallel with two spokes of the valve handwheel that form a largest angle therebetween. The second drive arm 130 is locked on the main drive arm 110 by aligning the aligning hole 131 to one of the plurality of aligning holes on the first plate 112, according to the number of spokes of the valve handwheel. This way, the drive force is transferred to two spokes that are farthest away from each other among spokes of the valve handwheel. This configuration delivers the drive force to the handwheel more uniformly for safer operation.

Once the handwheel tool is attached to the valve handwheel, a rotational drive tool may be loaded on the drive hub 120, driving the drive hub 120 to rotate. Here, the rotational drive tool may be powered by electricity or compressed air. In an example embodiment, the rotational drive tool may be a pipe threader which has a die that engages the drive hub 120. In one example, the die may comprise protrusions that engage a plurality of grooves located on the drive hub 120. When the pipe threader is powered on, the die rotates the drive hub 120 through its engagement with the grooves on the drive hub 120. The drive force originated from the rotational drive tool is transferred to the main drive arm 110 through the drive hub 120, and is further split between the main drive arm 110 and the second drive arm 130. In this example, the split drive forces are finally delivered to the spokes 152 and 154 of the handwheel 150 through the engagements of retainers 116 and 136, respectively.

Figure 3:
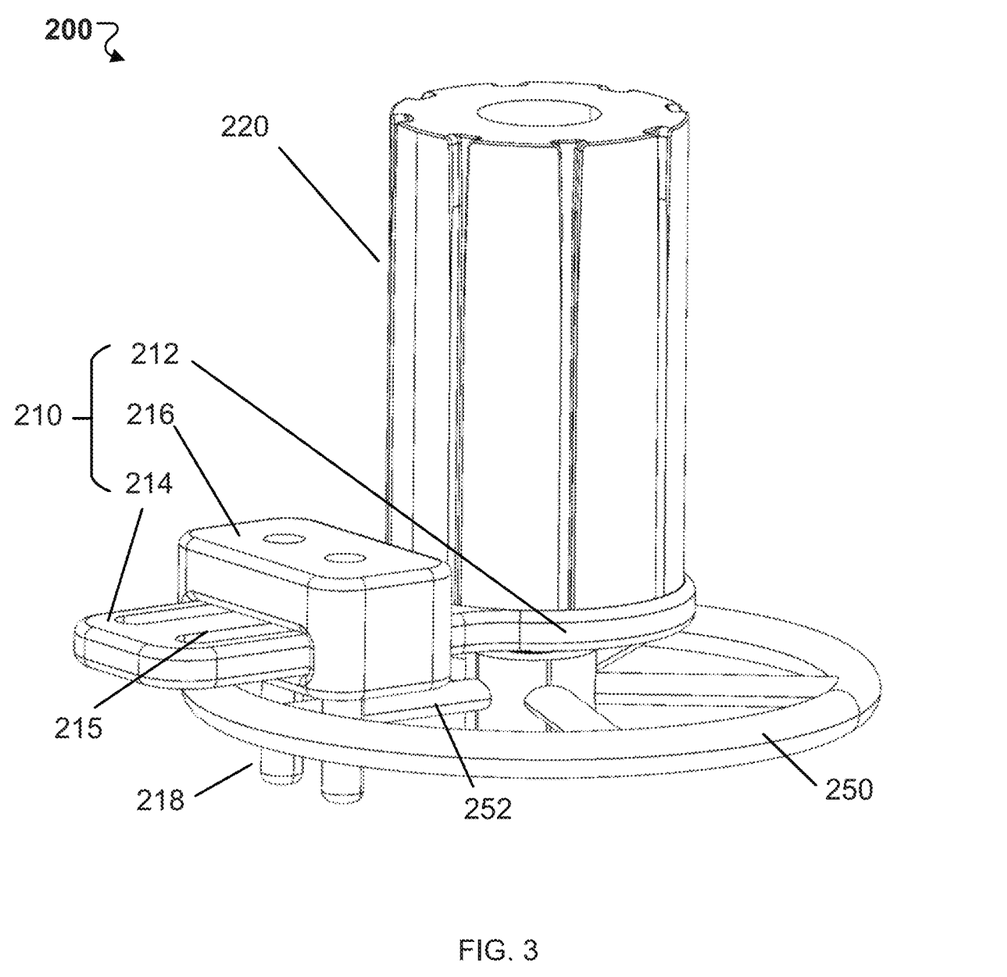
FIG. 3 is a perspective view of a portable valve handwheel tool for opening and closing a valve according to another example embodiment.

FIG. 3 is a perspective view of a portable valve handwheel tool 200 for opening and closing a valve according to another example embodiment. The portable valve handwheel tool 200 is configured to engage a spoke of a valve handwheel and to open or close the valve by rotating the handwheel. For example, the portable valve handwheel tool 200 may engage with spoke 252 of the five spoke handwheel 250. The portable valve handwheel tool 200 may open or close the valve by rotating the handwheel spoke 252 in a counterclockwise or clockwise direction, respectively.

In an example embodiment, the portable valve handwheel tool 200 includes a main drive arm 210, a drive hub 220, and a retainer 216. The main drive arm 210 has a plate 212 and a drive spoke 214. The plate 212 is disposed at one end of the drive spoke 214. Further, the retainer 216 has a pair of spoke rods 218. In this example, the drive hub 220 is positioned on the plate 212 of the main drive arm 210. Additionally, as shown on FIG. 3, the drive hub 220 may be in a cylinder shape and may extends from a top surface of the first plate 212.

In an example embodiment, the drive spoke 214 may include a pair of slots along a longitudinal axis of the drive spoke 214. The retainer 216 is attached on the drive spoke 214, having the drive spoke 214 pass therethrough. The retainer may optionally slide along the slots of the drive spoke 214 in a manner similar to the spoke slide of FIGS. 1 and 2. In the example shown in FIG. 3, the pair of spoke rods 218 may be single-end threaded rods and are inserted into a pair of through holes of the retainer 216. The pair of spoke rods 218 extend from a surface of the retainer 216 toward the handwheel 250. When the portable valve handwheel tool 200 is attached to handwheel 250, the slide rods 218 fit around spoke 252.

During operation, the rotational drive tool may be loaded on the drive hub 220 and deliver a drive force to rotate the drive hub 220. In this example, the drive hub 220 is locked on the plate 212 and thus the rotation of the drive hub 220 drives the drive spoke 214. The engagement between the retainer 216 and the spoke 252 further transfers the drive force from the drive spoke 214 to the spoke 252 of the handwheel 250. In an example embodiment, the portable valve handwheel tool 200 may be applied on a valve handwheel with three spokes, four spokes, five spokes, or six spokes. The portable valve handwheel tool 200 may fit on valve handwheels ranging in diameter from 4 inches to 8 inches.

Figure 4:
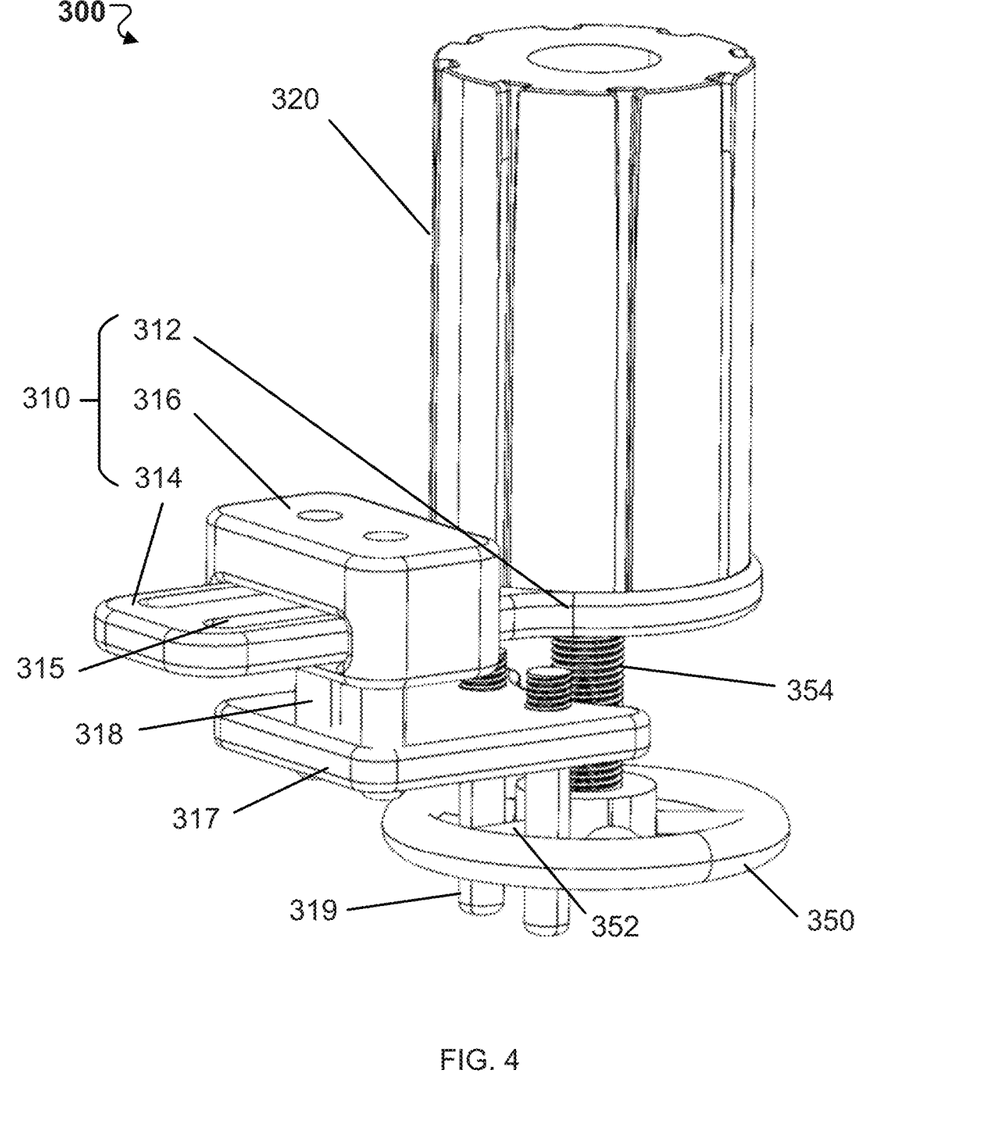
FIG. 4 is a perspective view of a portable valve handwheel tool for opening and closing a valve according to another example embodiment.

FIG. 4 is a perspective view of a portable valve handwheel tool 300 for opening and closing a valve according to another example embodiment. Similar to the portable valve handwheel tool 200, the portable valve handwheel tool 300 is configured to engage a spoke of a valve handwheel and to open or close the valve by rotating the handwheel in various directions. In this example, the portable valve handwheel tool 300 is configured to operate a smaller valve handwheel, e.g., valve handwheels with a diameter equal to or less than 4 inches. Here, the portable valve handwheel tool 300 includes a main drive arm 310, a drive hub 320, and a retainer 316. The main drive arm 310 has a plate 312 and a drive spoke 314. The plate 312 is disposed at one end of the drive spoke 314. The retainer 316 has a first pair of spoke rods 318. As shown in FIG. 4, the first pair of the spoke rods 318 has one end threaded into the retainer 316 and extends toward the handwheel 350. Further, the portable valve handwheel tool 300 includes a small wheel adapter 317 that includes a first pair of through holes and a second pair of through holes. In this example, the first and second pair of through holes are located at opposite ends of the small wheel adapter 317. Here, the other end of the first pair of the spoke rods 318 is inserted in the first pair of the through holes on the small wheel adapter 317. Further, a second pair of the spoke rods 319 has one end threaded into the second pair of through holes on small wheel adapter 317 and extends from the small wheel adapter 317 towards the handwheel 350.

In an example embodiment, the retainer 316 engages the spoke 352 of the handwheel 350 through the small wheel adapter 317 and the first and the second pairs of the spoke rods 318 and 319. With this configuration, the portable valve handwheel tool 300 is configured to operate small size handwheels that have a diameter equal to or less than 4 inches. During operation, the rotational drive tool may be loaded on the drive hub 320 and deliver a drive force to rotate the drive hub 320. The drive hub 320 is fixed to the plate 312 and thus the rotation of the drive hub 320 drives the drive spoke 314. The engagement between the drive spoke 314 and the spoke 352, through the small wheel adapter 317 and the first and the second pairs of the spoke rods 318 and 319, further transfers the drive force from the drive spoke 314 to the spoke 352 to rotate the handwheel 350.

Figure 5:
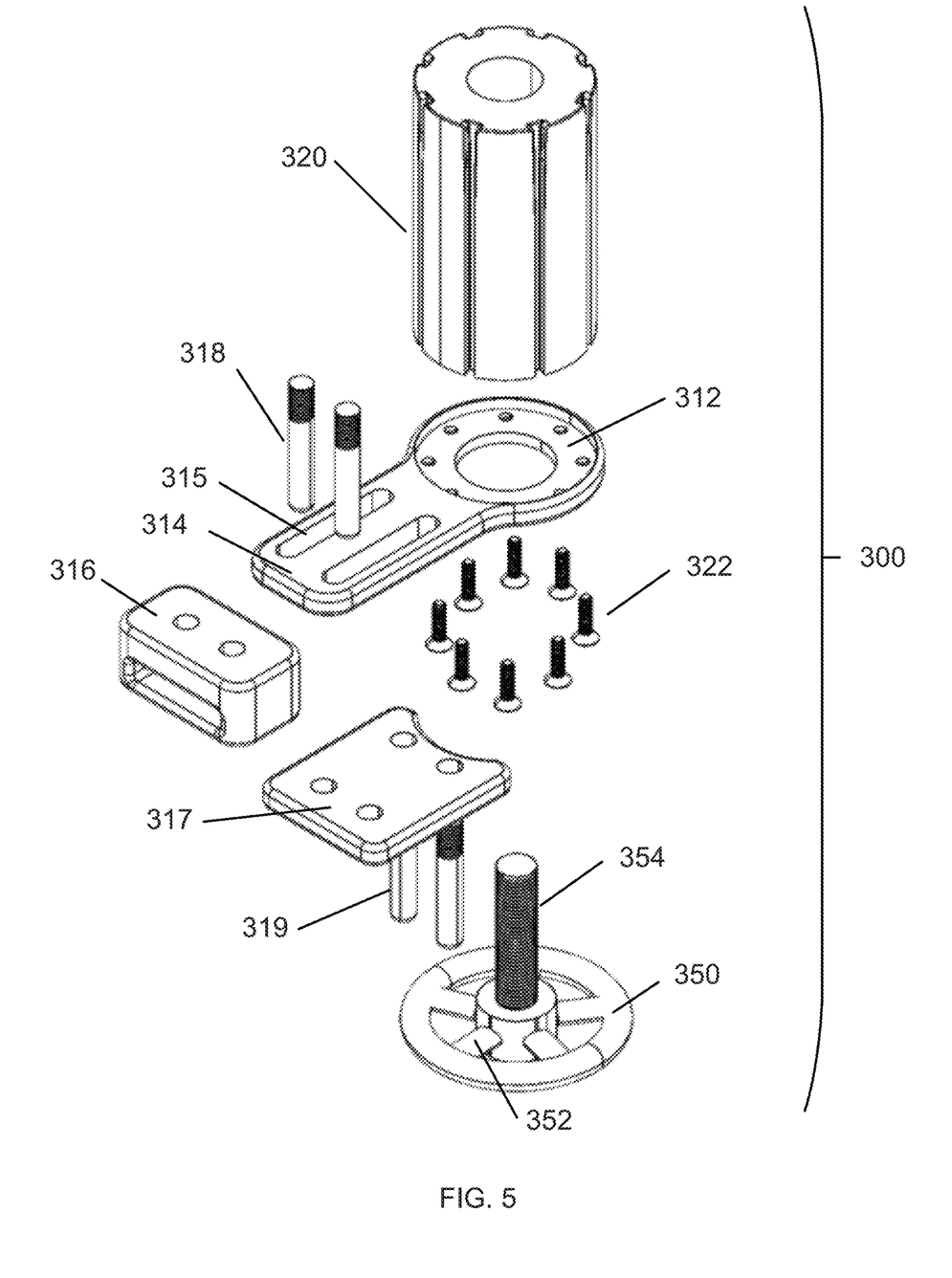
FIG. 5 is an exploded view of the portable valve handwheel tool of FIG. 4 according to another example embodiment.

FIG. 5 is an exploded view of the portable valve handwheel tool 300 of FIG. 4 according to an example embodiment. As described earlier on FIG. 4, the portable valve handwheel tool 300 includes a main drive arm 310, a drive hub 320, and a retainer 316. The first pair and the second pair of spoke rods 318 and 319 are single-end threaded rods and are threaded into the retainer 316 and the small wheel adapter 317, respectively. Further, the other end of the first spoke rods 318 are inserted to the first pair of through holes on the small wheel adapter 317 in order to lock the small wheel adapter 317 relative to the retainer 316. In this example, the second pair of spoke rods 319 extend toward the handwheel 350 and are in contact with at least one spoke, e.g., the spoke 352 of the handwheel 350.

In an example embodiment, the drive hub 320 is positioned on the drive arm 310 and tightened by a plurality of screws. For example, the drive hub 320 is tightened by 8 counter sunk screws 322 on the plate 312. Further, the drive arm 310 and the drive hub 320 are aligned on the handwheel 350 by passing a handwheel stem 354 through a center hole of the plate 312 of the drive arm 310 and a center through hole of the drive hub 320. In this example, the portable valve handwheel tool 300 is configured to open or close the valve handwheel 350 which is a five spoke handwheel with a diameter less than 4 inches. In other example embodiments, the portable valve handwheel tool 300 may be configured to rotate valve handwheels with three spokes, four spokes, five spokes, or six spokes.

Figure 6:
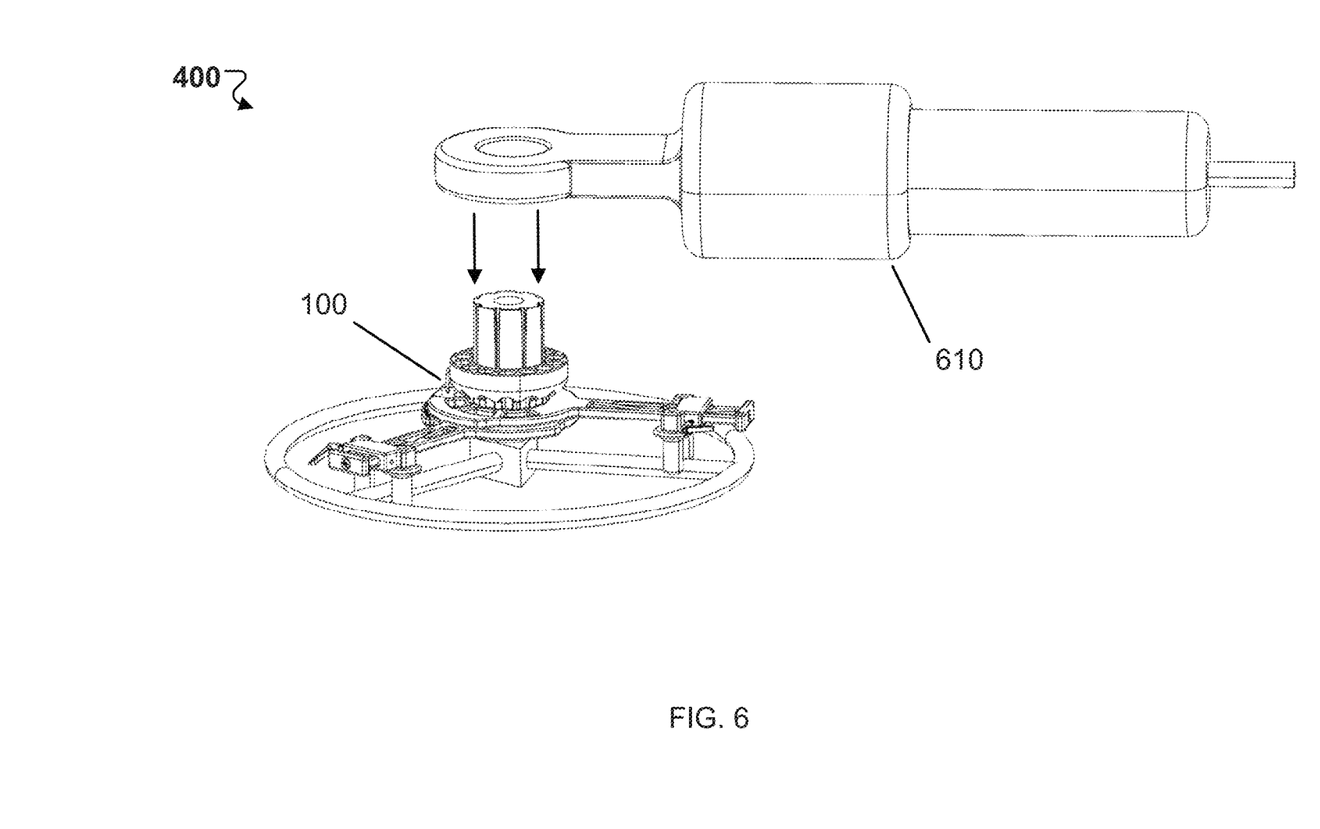
FIG. 6 illustrates a working example of operating the portable valve handwheel tool of FIG. 1 by using a rotational drive tool according to an example embodiment.

FIG. 6 illustrates a working example of operating the portable valve handwheel tool 100 of FIG. 1 by using a rotational drive tool 610 according to an example embodiment. Referring to FIGS. 1 and 6, in this example embodiment, the rotational drive tool 610 is connected with the portable valve handwheel tool 100 to rotate a valve handwheel. When powered on, the rotational drive tool 610 delivers a drive force to the portable valve handwheel tool 100 by rotating the drive hub 120 that is in contact with the rotational drive tool 610. Further, the drive force is transferred to the main drive arm 110 and split by the second drive arm 130. The first and second retainers 116 and 136 that engage the spokes of the handwheel finally deliver the split drive forces to the handwheel spokes and drive the handwheel to rotate. In this example, a user can switch the rotational drive tool 610 between different work modes so that it can rotate the drive hub 120 in a clockwise or a counterclockwise direction. Accordingly, the valve handwheel can be operated to rotate in a clockwise or a counterclockwise direction to close or open the valve, respectively.

In an example embodiment, the rotational drive tool 610 may be a pipe threader. As shown in FIG. 6, the pipe threader has an open space in its front portion, where the open space allows a subject to be loaded in. Here, the pipe threader is loaded on the portable valve handwheel tool 100 by passing the drive hub 120 through the open space of the pipe threader. The pipe threader is held laterally by the user and its longitudinal axis is generally aligned parallel to the plane defined by the main drive arm and the second drive arm of the valve handwheel tool. Here, the pipe threader may include a die with a plurality of protrusions that are located at an inner surface of the open space and are configured to clamp the subject during operation. In an example embodiment, the drive hub 120 may have a plurality of grooves that are located on its outer surface as illustrated in FIG. 1. The plurality of grooves may be aligned in parallel and extend along a longitudinal axis of the drive hub 120. Here, the plurality of protrusions may be aligned with and engage the plurality of grooves during the loading of the pipe threader on the drive hub 120. As a result, the user can power on the pipe threader to start rotating the drive hub 120 and apply a drive force on spokes of the handwheel to rotate the handwheel. There may be a switch on the pipe thread that the user can use to change a rotational direction of the die and thus change the direction of rotation of the drive hub and handwheel. In an example embodiment, the rotation drive tool 610 may be connected with a compressed air supply. This connection may provide compressed air in a range from 10 to 25 cubic feet per minute (cfm) at 70 to 120 pounds per square inch (psi). In an example embodiment, the rotational drive tool 610 may be connected to and driven by an electric power source.

Figure 7:
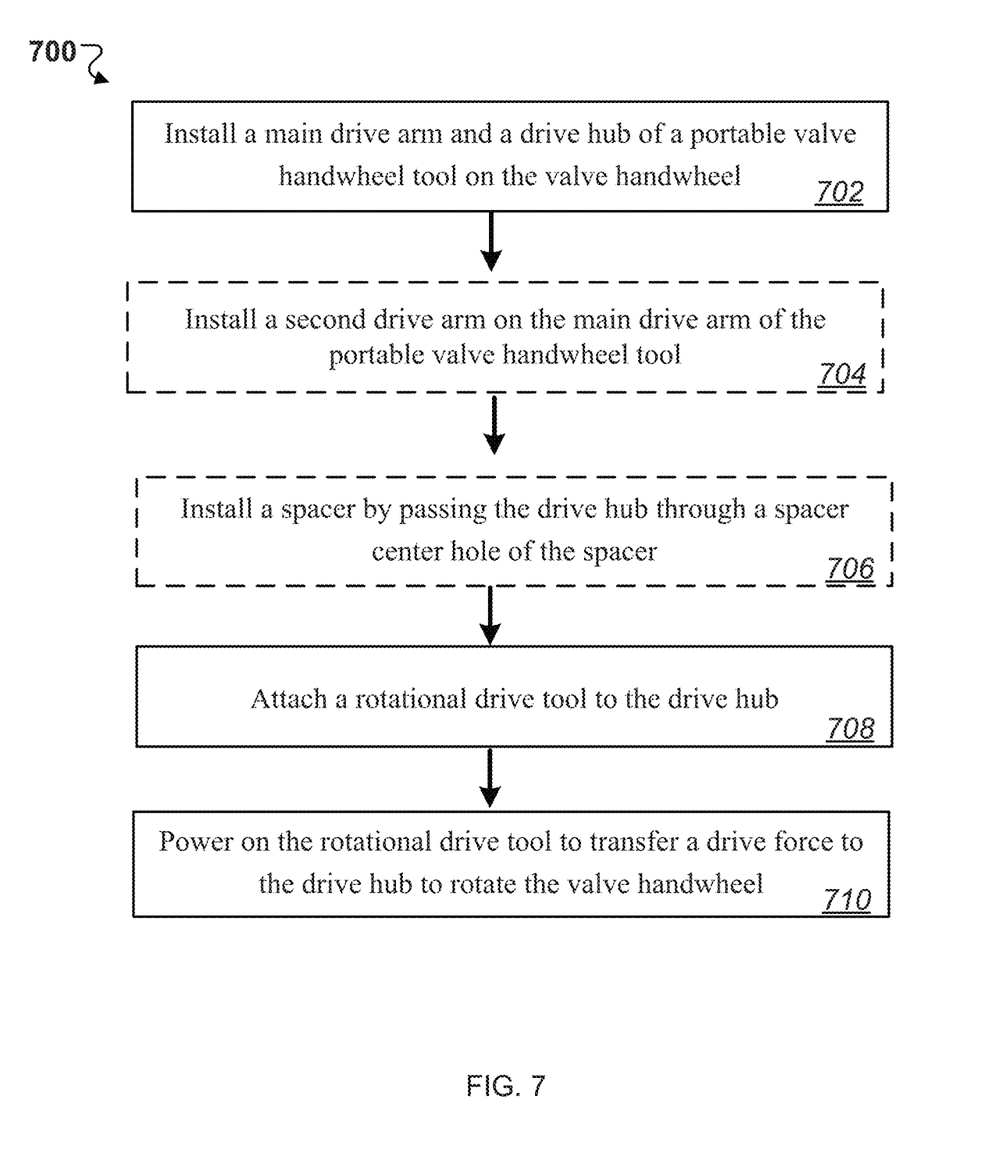
FIG. 7 illustrates a method for opening or closing a valve by a portable valve handwheel tool according to an example embodiment.

FIG. 7 illustrates a method 700 for opening or closing a valve by a portable valve handwheel tool according to an example embodiment. Referring to FIGS. 1 and 7, in an example embodiment, the method 700 includes installing a main drive arm and a drive hub of the portable valve handwheel tool on the valve handwheel, at 702. For example, the installing of the main drive arm 110 and the drive hub 120 can be conducted by passing a valve handwheel stem 156 through a main center hole of the main drive arm 110 and the drive hub 120, where a first spoke retainer 116 attached to a drive spoke 114 of the main drive arm 110 engages a first spoke 152 of the valve handwheel 150. The method 700 also includes attaching a rotational drive tool to the drive hub, at 708. For example, a rotational drive tool 610, e.g., a pipe threader, may be attached to the drive hub 120 of the portable valve handwheel tool 100. Lastly, the method 700 includes powering on the rotational drive tool to transfer a drive force to the drive hub to rotate the valve handwheel, at 710. For example, the rotational drive tool 610 may be powered on to transfer a drive force to the drive hub 120 of the portable valve handwheel tool 100. This drive force may be further delivered to the spoke 152 of the handwheel 150 through the main drive arm 110, to rotate the handwheel 150.

In an example embodiment, the method 700 may optionally include installing a second drive arm on the main drive arm of the portable valve handwheel tool, at 704. The installing of the second drive arm includes passing the drive hub through a second center hole of the second drive arm, aligning the second drive arm with the main drive arm, and inserting a quick release pin through a first aligning hole of the main drive arm and a second aligning hole of the second drive arm. Here, a second spoke retainer attached to a spoke of the second drive arm engages a second spoke of the valve handwheel. For example, a second drive arm 130 may be installed on the main drive arm 110 of the portable valve handwheel tool 100. The installing of the second drive arm 130 may include passing the drive hub 120 through a second center hole of the second drive arm 130. In addition, the second drive arm 130 may be aligned with the main drive arm 110. Further, a quick release pin 122 may be inserted through a first aligning hole 111 of the main drive arm 110 and a second aligning hole 131 of the second drive arm 130. In this example, a second spoke retainer 136 that is attached to a second drive spoke 134 may be configured to engage a second spoke 154 of the valve handwheel 150.

In an example embodiment, the method 700 may also optionally include installing a spacer by passing the drive hub through a spacer center hole of the spacer, at 706. For example, a spacer 140 may be installed on the portable valve handwheel tool 100 by passing the drive hub 120 through a spacer center hole of the spacer 140.

In the method 700, the drive force originated from the rotational drive tool may be split between the main drive arm and the second drive arm. For example, the drive force transferred from the rotational drive tool 610 to the drive hub 120 may be further split from the main drive arm 110 to the second drive arm 130 due to a locking mechanism therebetween. In this example, a ratio between drive forces applied on the main drive arm 110 and the second drive arm 130 may be in a range from 5:5 to 9:1.

For any figure shown and described herein, one or more of the components may be omitted, added, repeated, and/or substituted. Accordingly, embodiments shown in a particular figure should not be considered limited to the specific arrangements of components shown in such figure. Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure.

Referring generally to the examples herein, any components of the tool (e.g., the main drive arm, the second drive arm), described herein can be made from a single piece (e.g., as from a mold, injection mold, die cast, 3-D printing process, extrusion process, stamping process, or other prototype methods). In addition, or in the alternative, a component of the tool can be made from multiple pieces that are mechanically coupled to each other. In such a case, the multiple pieces can be mechanically coupled to each other using one or more of a number of coupling methods, including but not limited to epoxy, welding, fastening devices, compression fittings, mating threads, and slotted fittings. One or more pieces that are mechanically coupled to each other can be coupled to each other in one or more of a number of ways, including but not limited to fixedly, hingedly, removeably, slidably, and threadably.

Terms such as "first", "second", "top", "bottom", "side", "distal", "proximal", and "within" are used merely to distinguish one component (or part of a component or state of a component) from another. Such terms are not meant to denote a preference or a particular orientation, and are not meant to limit the embodiments described herein. In the example embodiments described herein, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Although particular embodiments have been described herein in detail, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the spirit and scope of the following claims, the scope of which are to be accorded the broadest interpretation so as to encompass modifications and equivalent structures.

What is claimed is:

1. A portable valve handwheel tool, comprising:
a main drive arm that is configured to rotate a valve handwheel, the main drive arm comprising:
a first drive spoke having a first retainer, the first retainer configured to engage a first spoke of the valve handwheel, and
a first plate that is disposed at one end of the first drive spoke, the first plate having a first center hole that allows a valve handwheel stem to pass therethrough;
a drive hub that extends from a broad side of the first plate of the main drive arm;
a second drive arm comprising:
a second drive spoke having a second retainer, the second retainer configured to engage a second spoke of the valve handwheel, and
a second plate that is disposed at one end of the second drive spoke, the second plate having a second center hole that allows the drive hub to pass therethrough; and
a locking mechanism that attaches the main drive arm to the second drive arm.

2. The portable valve handwheel tool of claim 1, wherein the locking mechanism comprises a quick release pin configured to be inserted into a first aligning hole of the first plate and a second aligning hole of the second plate.

3. The portable valve handwheel tool of claim 1, wherein at least one of the first plate and the second plate comprises a plurality of aligning holes.

4. The portable valve handwheel tool of claim 3, wherein the plurality of aligning holes allow the first drive spoke and the second drive spoke to be oriented with an angle between a first longitudinal axis of the first drive spoke and a second longitudinal axis of the second drive spoke, the angle being at least one of 0°, 120°, or 144°.

5. The portable valve handwheel tool of claim 1, further comprising a plurality of pointer markers, each of which corresponds to a number of spokes of the handwheel tool.

6. The portable valve handwheel tool of claim 1, wherein the portable valve handwheel tool is adjustable so that it is capable of attachment to at least two of: a 3 spoke valve handwheel, a 4 spoke valve handwheel, a 5 spoke valve handwheel, and a 6 spoke valve handwheel.

7. The portable valve handwheel tool of claim 1, wherein the first spoke retainer and the second spoke retainer are respectively located on the first drive spoke and the second drive spoke, the first and second spoke retainers being able to slide along longitudinal axes of the first and second drive spokes respectively.

8. The portable valve handwheel tool of claim 7, wherein each of the first and second retainers comprises:
a spoke slide lock, and
a pair of rollers configured to engage the first spoke or the second spoke when the portable valve handwheel tool is attached to the valve handwheel.

9. The portable valve handwheel tool of claim 1,
wherein the drive hub comprises features for receiving a rotational driving tool, and
wherein the drive hub is configured to transfer a drive force from the rotational driving tool to the main drive arm to rotate the valve handwheel.

10. The portable valve handwheel tool of claim 1, wherein the portable valve handwheel tool is configured to drive the valve handwheel alternately in a clockwise and a counterclockwise direction to open and close the valve.

11. The portable valve handwheel tool of claim 1, further comprising a first spoke endcap that is located at another end of the first drive spoke and a second drive spoke endcap that is located at another end of the second drive spoke.

12. The portable valve handwheel tool of claim 1, wherein a diameter of the valve handwheel is in a range from 8 inches to 18 inches.

13. A portable valve handwheel tool, comprising:
a drive arm that is configured to rotate a valve handwheel, the drive arm comprising:
a drive spoke having a retainer, the retainer configured to engage a spoke of the valve handwheel and wherein the retainer is slidable along a longitudinal axis of the drive spoke, and a plate disposed at one end of the drive spoke, the plate having a center hole that allows a valve handwheel stem to pass therethrough; and a drive hub that extends from a broad side of the plate of the drive arm, wherein the center hole of the plate is aligned with a center through hole of the drive hub.

14. The portable valve handwheel tool of claim 13, wherein the retainer further comprises a first pair of spoke rods extending from the retainer.

15. The portable valve handwheel tool of claim 14, further comprising a small wheel adapter that has a first pair of through holes and a second pair of through holes, wherein the first pair of through holes attach to the first pair of spoke rods to lock the small wheel adapter to the drive spoke, and wherein a second pair of spoke rods are attached to the second pair of through holes on the small wheel adapter and are configured to engage opposite longitudinal sides of the spoke of the valve handwheel.

16. The portable valve handwheel tool of claim 13, wherein a diameter of the valve handwheel is in a range from 4 inches to 8 inches.

17. A portable valve handwheel tool, comprising:

a drive arm that is configured to rotate a valve handwheel, the drive arm comprising:

a drive spoke having a retainer, the retainer configured to engage a spoke of the valve handwheel, and a plate disposed at one end of the drive spoke, the plate having a center hole that allows a valve handwheel stem to pass therethrough; and a drive hub that extends from a broad side of the plate of the drive arm, wherein the center hole of the plate is aligned with a center through hole of the drive hub, and wherein the drive hub comprises features for receiving a rotational driving tool, and the drive hub is configured to transfer a drive force from the rotational driving tool to the drive arm to rotate the valve handwheel.

18. A method of operating a valve handwheel, comprising:

installing a main drive arm and a drive hub of a portable valve handwheel tool on the valve handwheel by passing a valve handwheel stem through a main center hole of the main drive arm and the drive hub, wherein a first spoke retainer attached to a drive spoke of the main drive arm engages a first spoke of the valve handwheel;

attaching a rotational drive tool to the drive hub; and powering on the rotational drive tool to transfer a drive force to the drive hub to rotate the valve handwheel.

19. The method of claim 18, further comprising:

installing, on the main drive arm, a second drive arm of the portable valve handwheel tool, comprising:

passing the drive hub through a second center hole of the second drive arm, aligning the second drive arm with the main drive arm, and inserting a quick release pin through a first aligning hole of the main drive arm and a second aligning hole of the second drive arm, wherein a second spoke retainer attached to a spoke of the second drive arm engages a second spoke of the valve handwheel; and installing a spacer by passing the drive hub through a spacer center hole of the spacer, wherein a portion of the drive force is split from the main drive arm to the second drive arm, and a ratio between drive forces applied on the main drive arm and on the second drive arm is in a range from 5:5 to 9:1.

* * * * *